(12) United States Patent
Badaire et al.

(10) Patent No.: US 6,382,670 B2
(45) Date of Patent: May 7, 2002

(54) LINEAR GUIDE DEVICE FOR AN AUTOMOBILE VEHICLE STEERING COLUMN

(75) Inventors: Philippe Badaire, Montoire; Benoît Paillard, Vendome; André Laisement, La Chapelle Encherie; Benoît Duval, Vendome, all of (FR)

(73) Assignee: Nacam France SA, Vendome (FR)

( * ) Notice: Subject to any disclaimer, the term of this patent is extended or adjusted under 35 U.S.C. 154(b) by 0 days.

(21) Appl. No.: 09/785,420

(22) Filed: Feb. 20, 2001

(30) Foreign Application Priority Data

Feb. 24, 2000 (FR) .............................................. 00 02484

(51) Int. Cl.⁷ ................................................. B62D 1/19
(52) U.S. Cl. ....................................................... 280/777
(58) Field of Search ............................... 280/775, 777, 280/779; 74/552, 492, 493

(56) References Cited

U.S. PATENT DOCUMENTS

| | | | | |
|---|---|---|---|---|
| 3,788,148 A | * | 1/1974 | Connell et al. | |
| 4,509,386 A | * | 4/1985 | Kimberlin | |
| 4,774,851 A | * | 10/1988 | Iwanami et al. | |
| 5,737,971 A | * | 4/1998 | Riefe et al. | |
| 6,170,874 B1 | * | 1/2001 | Fosse | |
| 6,183,012 B1 | * | 2/2001 | Dufour et al. | |
| 6,234,528 B1 | * | 5/2001 | Ben-Rhouma et al. | |
| 6,244,128 B1 | * | 6/2001 | Spencer et al. | |

FOREIGN PATENT DOCUMENTS

JP            07117685         10/1993

* cited by examiner

Primary Examiner—Paul N. Dickson
(74) Attorney, Agent, or Firm—Lawrence E. Laubscher, Sr.

(57) ABSTRACT

A linear guide device for an automobile vehicle steering column includes a steering shaft rotatably mounted inside a guide-tube which is connected to a support assembly which is fixed to the chassis of the vehicle. A fixed support member is fastened to the chassis of the vehicle. A mobile support member is connected to the fixed support member in order to constitute the support assembly and is immobilized to the fixed support member against forces up to particular value. Rolling members are disposed between fixed rollways formed on the fixed support member and mobile rollways formed on the mobile support member. The fixed and mobile rollways each lie in the required guidance direction.

10 Claims, 6 Drawing Sheets

LINEAR GUIDE DEVICE FOR AN AUTOMOBILE VEHICLE STEERING COLUMN

BACKGROUND OF THE INVENTION

1. Field of the Invention

The present invention relates to a linear guide device for an automobile vehicle steering column.

The device according to the invention applies in particular to a steering column whose depth and/or inclination can be adjusted and whose steering shaft is mounted inside a body-tube which is supported on and immobilized to the body of the vehicle in the required position. The steering column includes a steering shaft rotatably mounted inside a body-tube which is connected to a support assembly fixed to the chassis of the vehicle or to an element of the body of the vehicle. The invention can also be applied to a non-adjustable steering column, in which case the body-tube is mounted directly in the support assembly.

2. Description of the Prior Art

The ongoing improvement to the safety of steering columns requires manufacturers to master all parameters of energy absorbing systems. Accordingly, with particular reference to the method of absorbing energy by unwinding a wire, which is increasingly used on steering columns, it is necessary to prevent the mobile assembly moving relative to the fixed assembly at the time of impact with unintentional resisting forces which are due to wedging, clamping or play phenomena. All these drawbacks are associated with poor linear guiding of the mobile assembly relative to the fixed assembly.

The object of the present invention is to propose a linear guide device for guiding the mobile assembly of an automobile vehicle steering column relative to the fixed assembly at the time of impact to prevent the occurrence of unwanted forces that interfere with the required absorption of energy.

Moreover, the linear guide device must be easy to mount within the overall dimensions of existing steering columns.

OBJECT OF THE INVENTION

The invention relates to a linear guide device for an automobile vehicle steering column, which device includes a steering shaft rotatably mounted inside a guide-tube which is connected to a support assembly which is fixed to a chassis of the vehicle. The linear guide device includes a fixed support member which is adapted to be fastened to said chassis of said vehicle and a mobile support member which is adapted to be connected to said fixed support member in order to constitute said support assembly and which is immobilized to said fixed support member against forces up to particular value such that it is no longer immobilized in the event of an impact, said device further including rolling members which are disposed between a fixed rollway formed on said fixed support member and a mobile rollway formed on said mobile support member, said fixed rollway and said mobile rollway each lying in the required guidance direction.

In a embodiment of the invention, the linear guide device is adapted to operate in a guidance direction that is raised toward the front relative to a horizontal plane so that in the event of an impact the steering wheel is raised and pushed forward.

In another embodiment of the invention, the linear guide device is adapted to operate in a guidance direction that is inclined toward the front relative to a horizontal plane so that in the event of an impact said steering wheel is lowered and pushed forward.

Advantageously, the rolling members are balls. Moreover the roller members have a retaining cage to guarantee the position of said rolling members relative to each other.

According to some structures of the invention, at least one fixed rollway is formed on a fixed slide which constitutes an independent member mounted on and fixed to said fixed support member; and at least a mobile rollway is formed on a mobile slide which constitutes an independent member mounted on and fixed to said mobile support member.

According to other structures of the invention, at least one fixed rollway is formed directly on said fixed support member and constitutes an integral part of said fixed support member; and at least a mobile rollway is formed directly on said mobile support member and constitutes an integral part of said mobile support member.

According to an interesting feature of the invention:

said fixed support member has a fixed slide disposed in a housing on each of its uprights;

a corresponding fixed rollway is formed in each fixed slide;

said mobile support member has a mobile slide on each of its lateral portions, one end of which has a tenon which engages in a notch formed in the corresponding lateral portion, said tenon being extended by a tongue substantially parallel to said mobile slide so as to come into contact with an inner face of the corresponding lateral portion, the other end of said mobile side having a hole through it facing another hole through the corresponding lateral portion to receive means for fixing said mobile slide to the corresponding lateral portion;

a corresponding mobile rollway is formed in each mobile slide; and the balls are disposed between said fixed rollway and said mobile rollway.

Advantageously, according to the invention, the fixed rollways have axes inclined at an angle to the axis which represents the guide direction.

In another structure, the mobile rollways have axes inclined at an angle to the axis which represents the guide direction.

In another embodiment, the fixed rollways have axes inclined to the axis which represents the guide direction and said mobile rollways have axes inclined to the axis which represents the guide direction.

The linear guide device according to the invention therefore has the advantage of having a structure that is extremely simple to produce, allowing the possibility of very high manufacturing quality when mass-produced, as is the case in the automobile industry. This simplicity of manufacture also leads to a very low cost. The linear guide device according to the invention finally has the decisive advantage of preventing the occurrence of unwanted forces that interfere with the required absorption of energy. Thus the linear guide device absorbs energy in the required manner. Moreover, the device is easy to fit within the overall dimensions of existing steering columns.

BRIEF DESCRIPTION OF THE DRAWINGS

Other features and advantages of the present invention will become more clearly apparent on reading the following description of preferred embodiments of the invention, which description is given with reference to the corresponding accompanying drawings, in which.

DESCRIPTION OF THE PREFERRED EMBODIMENTS

Figure 1:
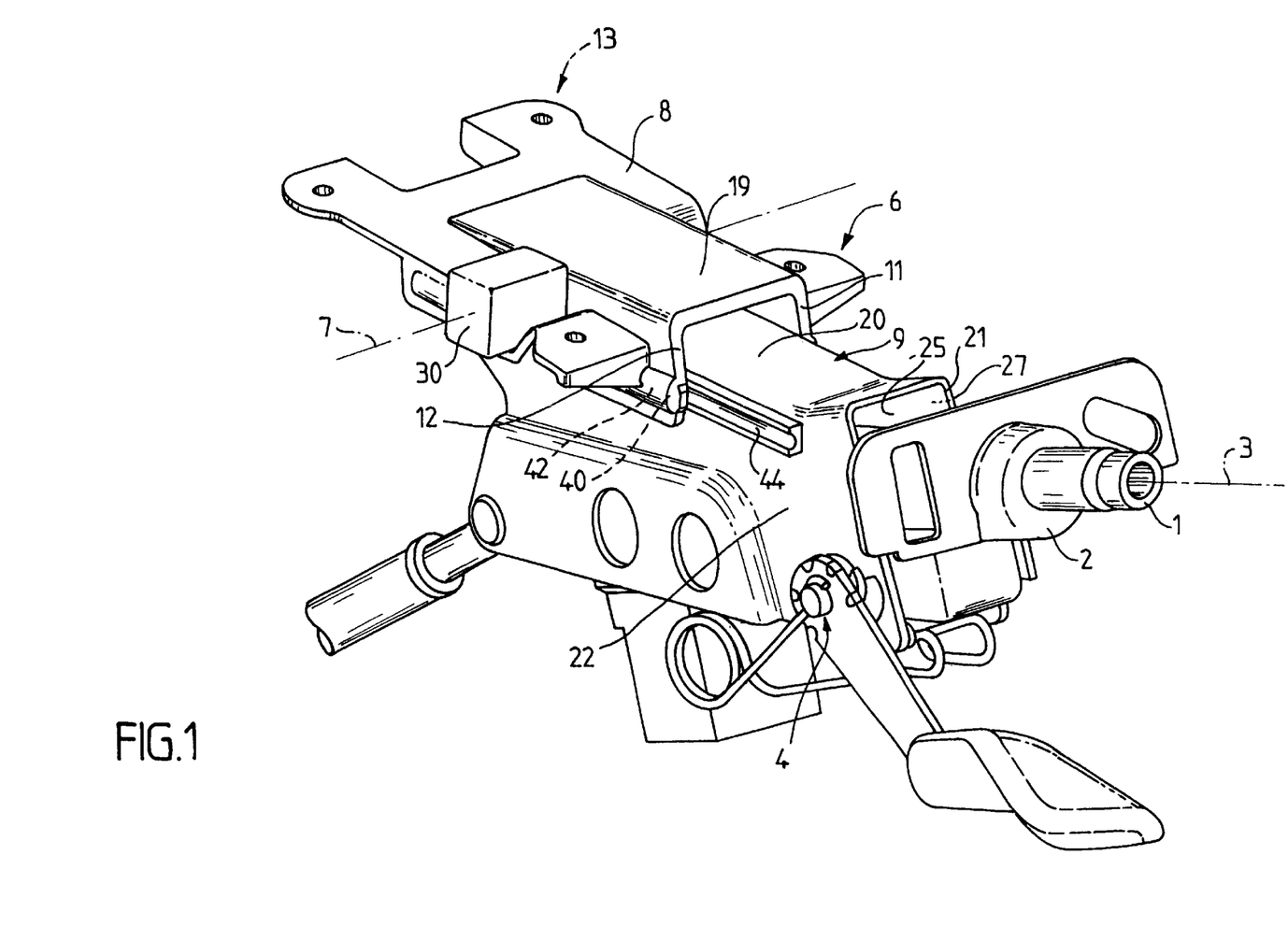
FIG. 1 is a top perspective view of an automobile vehicle steering column which is fitted with a linear guide device according to the invention.
Figure 2:
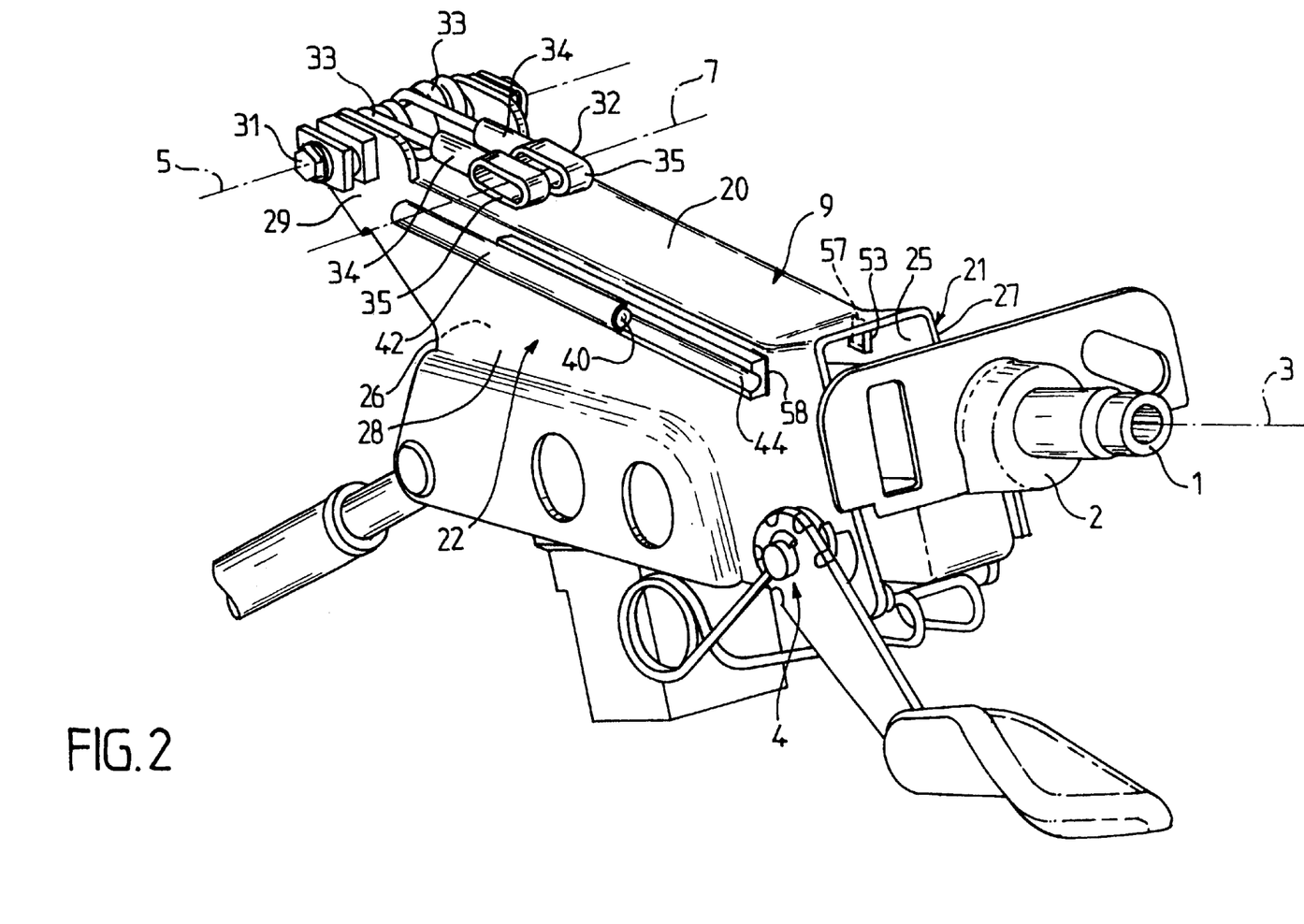
FIG. 2 is a view similar to FIG. 1 in which the fixed support member is not shown.
Figure 3:
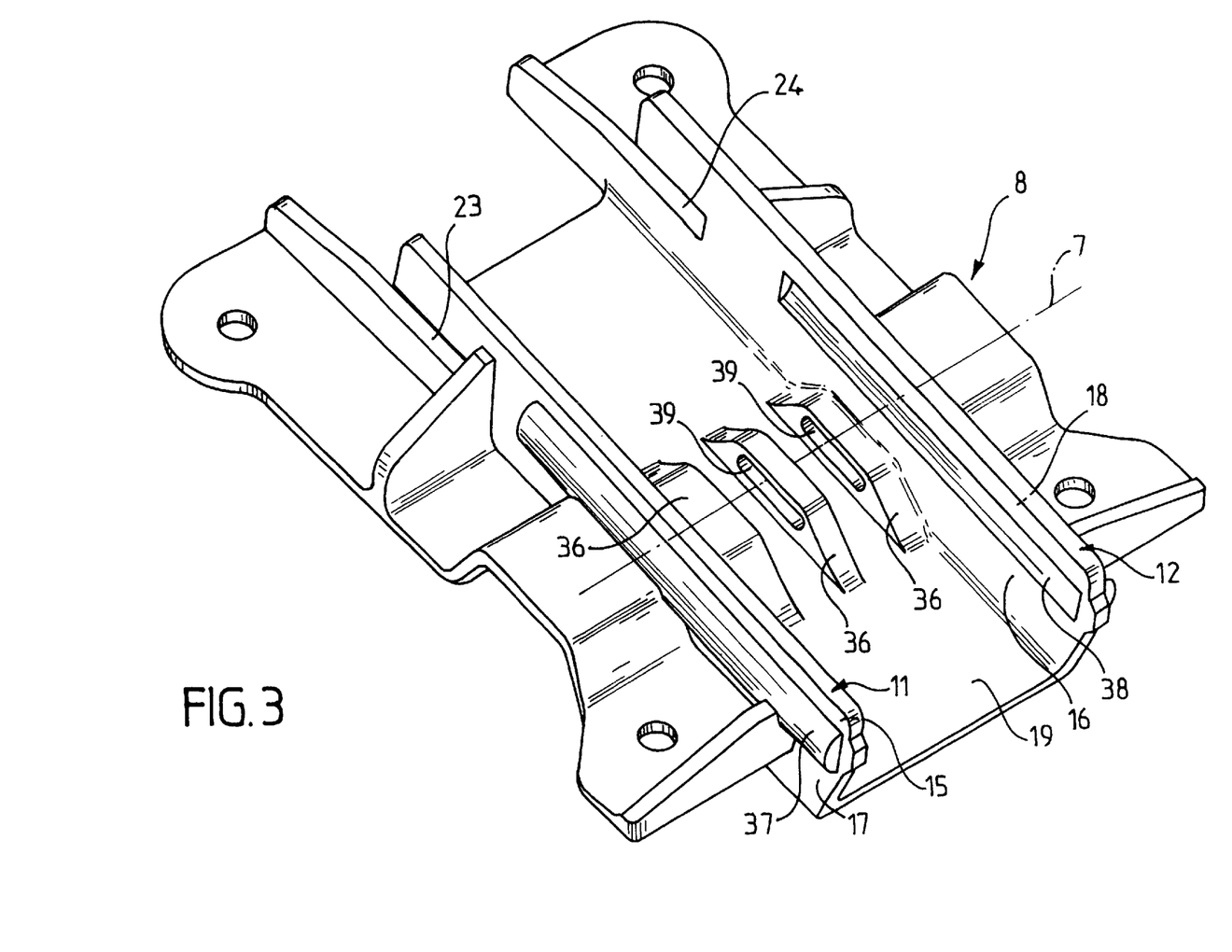
FIG. 3 is a bottom perspective view of the fixed support member of the device according to the invention shown in FIG. 1.

As can be seen in FIGS. 1, 2 and 3, the automobile vehicle steering column includes a steering shaft 1 which is rotatably mounted in a body-tube 2 to rotate about a steering axis 3. The body-tube 2 is connected to a support assembly 6 by a system 4 for adjusting its depth and/or inclination. The invention can equally apply to a non-adjustable steering column, in which case the body-tube 2 is connected directly to the support assembly 6.

The support assembly 6 includes a fixed support member 8 and a mobile support member 9. The fixed support member 8 is fastened to the chassis 13 of the vehicle or to an element of the body of the vehicle not shown in FIG. 1. The mobile support member 9 is connected to the body-tube 2 by the position adjustment system 4. The mobile support member 9 is connected to the fixed support member 8 and said mobile support member 9 is immobilized relative to said fixed support member 8 against forces up to a particular value which allows for the impact to be absorbed, from which particular value the mobile support member 9 is able to slide inside the fixed support member 8.

The fixed support member 8 includes a base 19 with two substantially vertical uprights 11 and 12 mounted on the base 19. The uprights 11 and 12 are substantially parallel to the steering axis 3 and more particularly substantially parallel to the vertical plane passing through the steering axis 3.

The mobile support member 9 includes two substantially vertical lateral portions 21 and 22 and a substantially horizontal connecting portion 20. The two lateral portions 21 and 22 of the mobile support member 9 engage between the two uprights 11 and 12 of the fixed support member 8. They are substantially parallel to the steering axis 3, and more particularly substantially parallel to the vertical plane passing through the steering axis 3.

Each of the lateral portions 21 and 22 has a hole in its lower part through which a pin of the adjustment systems 4 passes.

In the remainder of the description, and when referring to the same member, the term "inner" when used in relation to the steering axis 3 means nearer the steering axis 3 and the term "outer" means farther away from it.

Accordingly, the upright 11 of the fixed support member 8 has an inner face 15 and an outer face 17 relative to the steering axis 3. Similarly, the upright 12 has an inner face 16 and an outer face 18 relative to the same steering axis 3.

In the same way as for the mobile support member 9, the lateral portion 21 has an inner face 25 and an outer face 27 and the lateral portion 22 has an inner face 26 and an outer face 28.

As can be seen in FIGS. 1, 2 and 3, the energy-absorbing device is adjustable and includes a retaining pin 5, an attachment pin 7, and a plurality of windings 33, namely two windings in the device shown in the figures.

The retaining pin 5 is substantially perpendicular to the steering axis 3 of the steering column and is disposed inside the mobile support member 9. The attachment pin 7 is substantially perpendicular to the steering axis 3 of the steering column and is disposed inside the fixed support member 8. The windings 33 are made from a metal member of particular cross section, which can be round, rectangular or square, for example. The windings 33 are mounted on a roller which is disposed on the retaining pin 5 fastened to the mobile support member 9 and disposed at its end 29.

The windings 33 have respective free ends 35 which are attached to the attachment pin 7 which is disposed on the fixed support member 8. The corresponding end 29 of the mobile support member 9 is at the same end as the steering box, i.e. at the end opposite the steering wheel.

The attachment pin 7 for the windings 33 takes the form of a retaining rod 32 which can move along its axis. It is moved by an actuator 30 which is operated by control means. In this way it is possible to connect the attachment pin 7 to the retaining pin 5 by a required number of windings, which number is determined according to the characteristics of the driver and in particular the driver's weight. Accordingly, in the event of an impact, the support member 9 which is connected to the body-tube 2, and therefore to the steering wheel, pulls on the free end of the windings, which are attached to attachment pin 7, and therefore unwinds the winding or windings to absorb the energy to be dissipated.

The two windings 33 are mounted on a roller. The roller is disposed on a sleeve around the retaining pin 5. Each winding 33 has a rectilinear portion 34 in substantially the same direction as the force to be damped. Each rectilinear portion 34 is extended by a free end 35 which surrounds the retaining rod 32.

The retaining pin 5 takes the form of a retaining rod 31 which passes through the mobile support member 9. The retaining rod 31 carries a sleeve which is disposed between the respective inner faces 25 and 26 of the two lateral portions 21 and 22 of the mobile support member 9. The retaining rod 31 is held at each end by a fixing assembly which is mounted on the lateral portions 21 and 22 of the mobile support member 9.

The attachment pin 7 is materialized by the retaining rod 32 which is mounted in holes 39 (FIG. 3). The holes are formed in lugs 36 of the fixed support member 8.

Each of the uprights 11 and 12 of the fixed support member 8 has a respective slot hole 23 and 24 through which the retaining pin 5 of the windings 33, i.e. the retaining rod 31, passes.

Figures 4, 4A, 5:
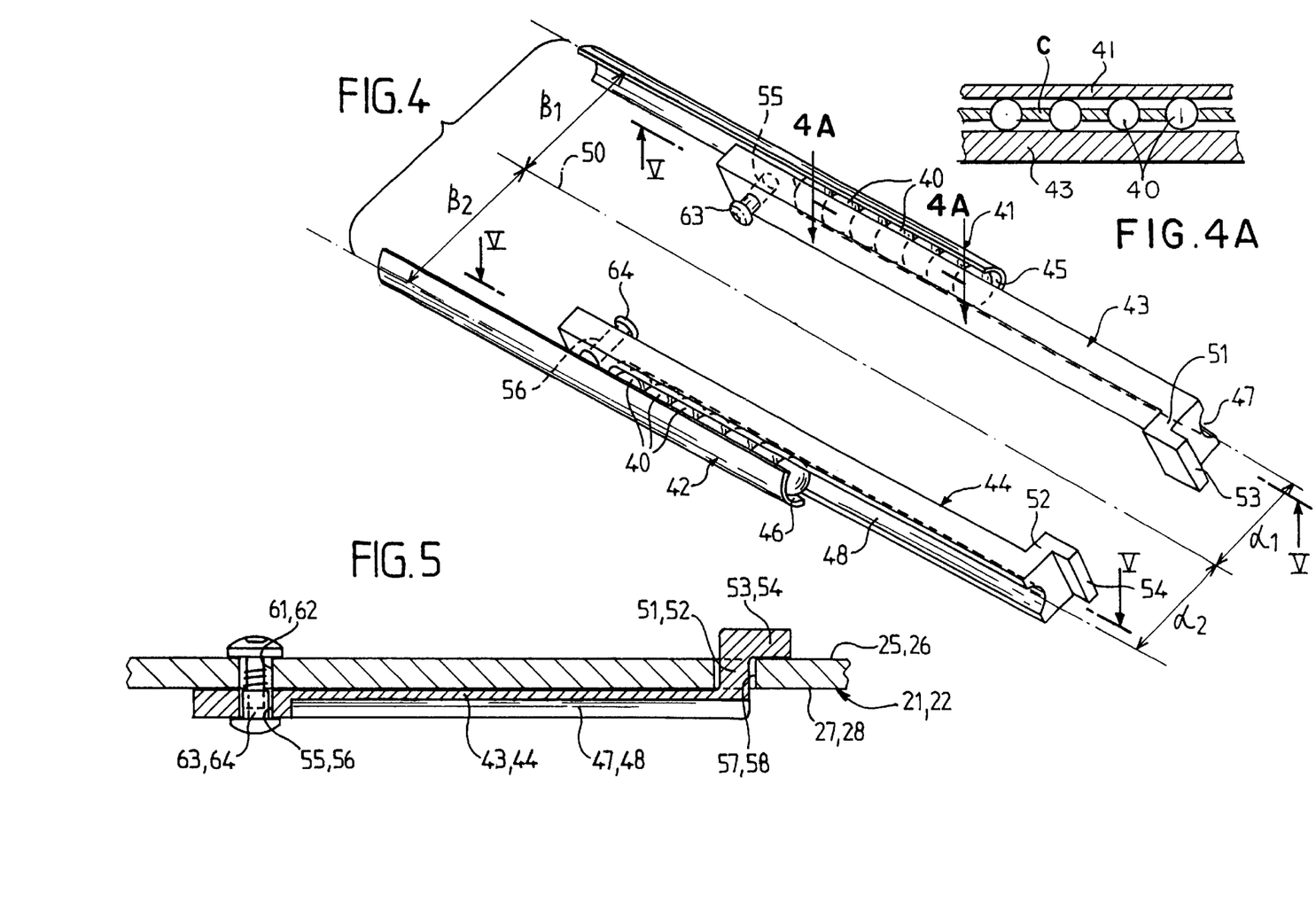
FIG. 4 is a perspective view corresponding to FIG. 1 of the various components of the embodiment of the linear guide device shown in FIG. 1.
FIG. 4A is a sectional view taken along line 4A—4A of FIG. 4.
FIG. 5 is a partial view in axial section taken along the line V—V in FIG. 4.

As can also be seen in FIGS. 4 and 5, the fixed support member 8 has on each of its uprights 11 and 12 a fixed slide 41 and 42 which is disposed in a housing 37 and 38 of the corresponding upright 11 and 12.

A corresponding fixed rollway 45 and 46 is provided in each fixed slide 41 and 42.

The mobile support member 9 has on each of its lateral portions 21 and 22 a respective mobile slide 43 and 44 one end of which is provided with a respective tenon 51 and 52 which engages and extends through a respective opening 57 and 58 formed in the respective corresponding lateral portion 21 and 22. Each tenon 51 and 52 is extended by a respective tongue 53 and 54 substantially parallel to the respective mobile slide 43 and 44 so as to come into contact with the respective inner face 25 and 26 of the respective corresponding lateral portion 21 and 22.

The other ends of said mobile slides 43 and 44 include respective holes 55 and 56 facing respective other holes 61 and 62 formed in the respective corresponding lateral portions 21 and 22 to receive respective means 63 and 64 for fixing the respective mobile slides 43 and 44 to the respective corresponding lateral portions 21 and 22.

A respective corresponding mobile rollway 47 and 48 is formed in each of the mobile slides 43 and 44.

Rolling members in the form of balls 40 are disposed between the fixed rollways 45 and 46 and the mobile rollways 47 and 48.

The rolling members 40 have a retaining cage C (FIG. 4A) to guarantee the position of the rolling members relative to each other.

Accordingly, in accordance with the invention, rolling members, which can be balls 40, are disposed between at least one fixed rollway 45, 46 formed on the fixed support member 8 and at least one mobile rollway 47, 48 formed on the mobile support member 9. The fixed rollways 45 and 46 and the mobile rollways 47 and 48 are each formed in the required guidance direction.

Figure 6:
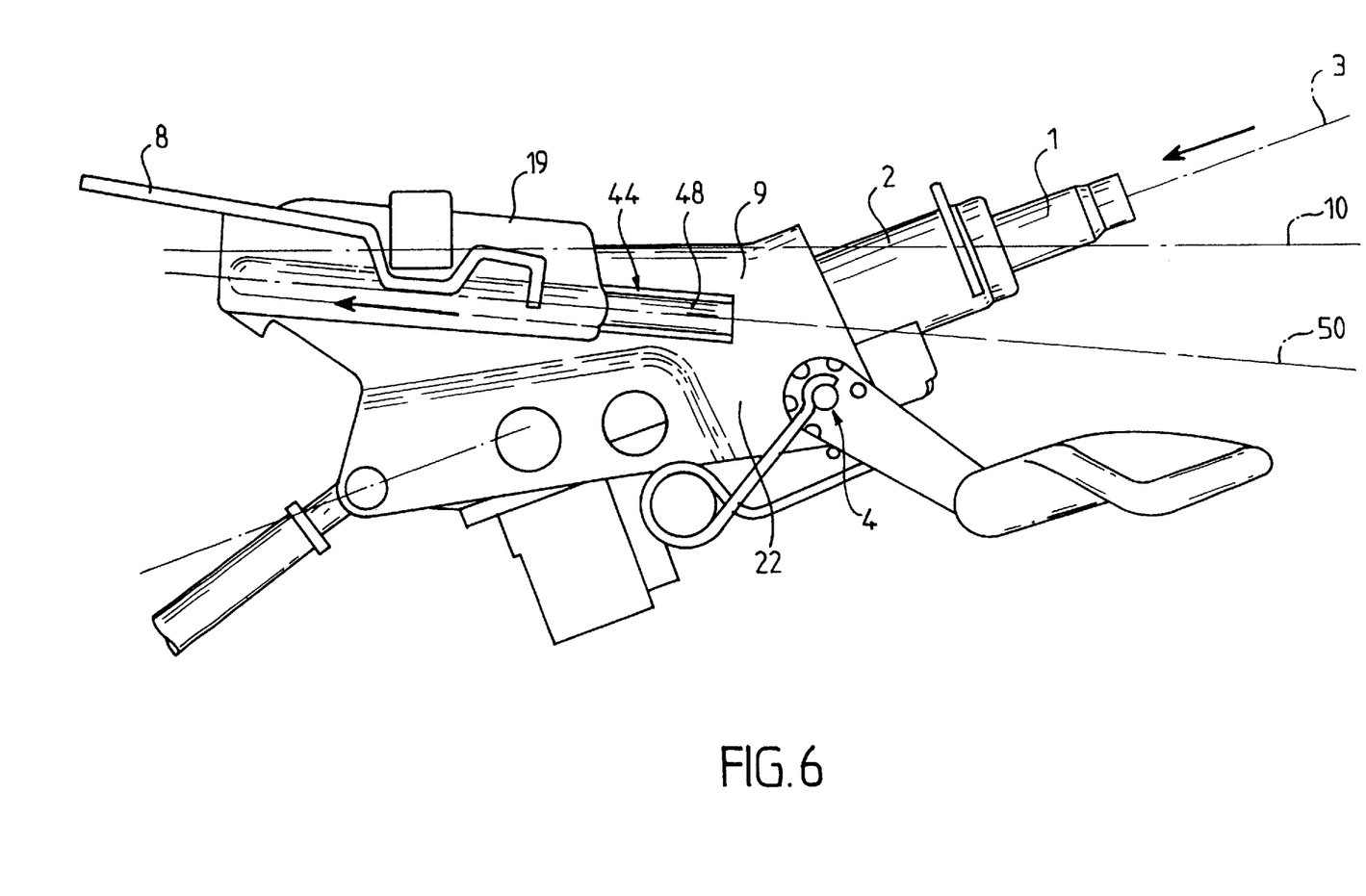
FIG. 6 is a lateral view of the assembly corresponding to FIG. 1, with the guide inclined to the horizontal.

In an embodiment of the invention shown in FIG. 6 the linear guide device, which includes rollways 45, 46, 47, 48, operates in a guide direction represented by the axis 50 which is raised towards the front relative to the horizontal plane 10, so that in the event of an impact the steering wheel is raised and pushed forward.

Figure 7:
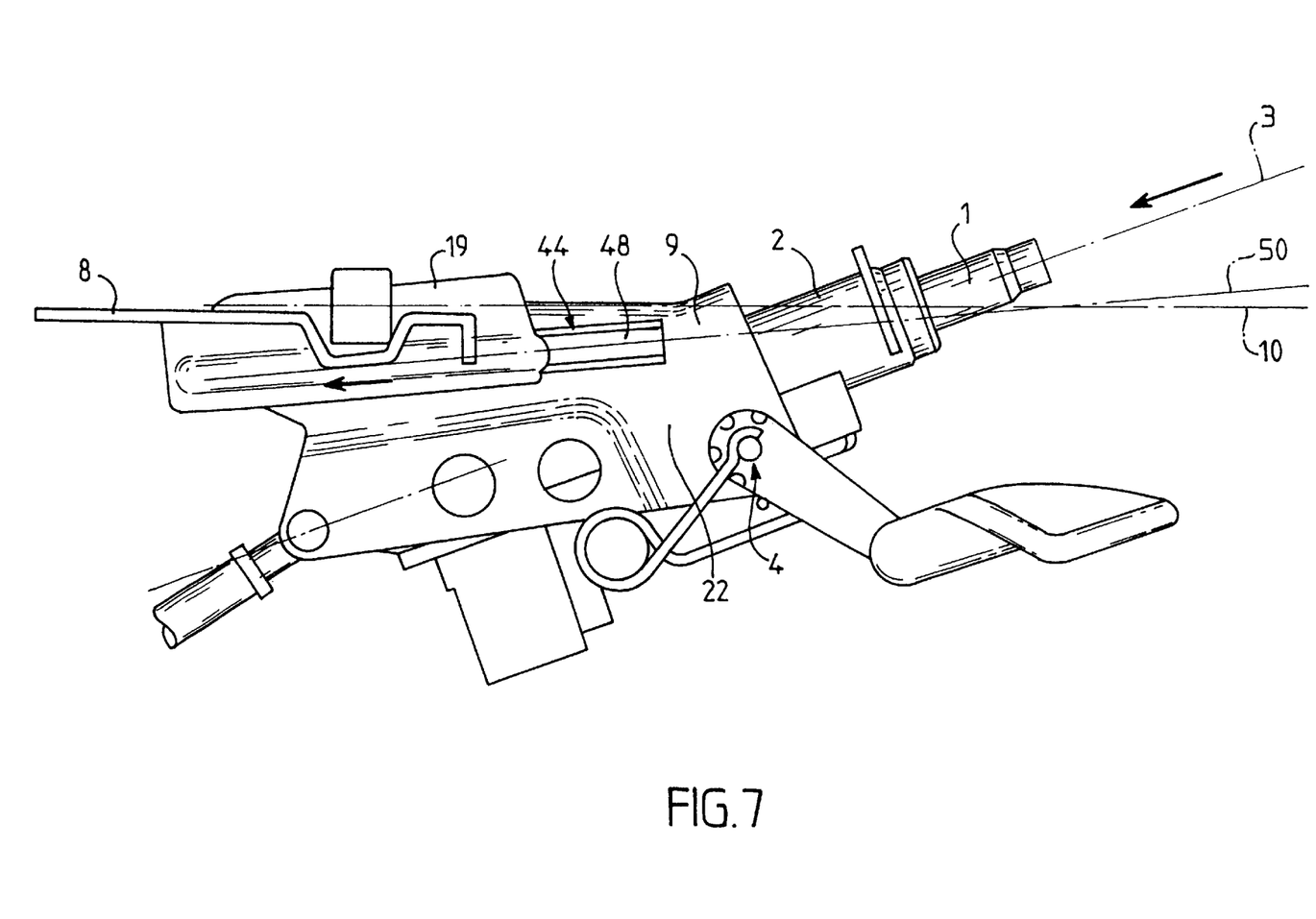
FIG. 7 is a lateral view of the assembly corresponding to FIG. 1 with a different inclination of the guide relative to the horizontal.

In another embodiment of the invention, shown in FIG. 7, the linear guide device, which includes rollways 45, 46, 47, 48, operates in a guide direction represented by the axis 50 which is inclined toward the front relative to the horizontal plane 10, so that in the event of an impact the steering wheel is lowered and pushed forward.

In some structures according to the invention, fixed rollways 45 and 46 are formed on fixed slides 41 and 42 which take the form of an independent member mounted on and fixed to the fixed support member 8 and mobile rollways 47 and 48 are formed on mobile slides 43 and 44 which take the form of an independent member mounted on and fixed to the mobile support member 9.

In other embodiments of the invention fixed rollways 45 and 46 are formed directly on the fixed support member 8 and form an integral part of the fixed support member 8 and mobile rollways 47 and 48 are formed directly on the mobile support member 9 and form an integral part of the mobile support member 9.

In an embodiment of the invention shown in FIG. 4 the axes of the fixed rollways 45 and 46 are inclined at respective angles β1 and β2 to the axis 50, which represents the guide direction.

In another embodiment of the invention shown in FIG. 4 the axes of the mobile rollways 47 and 48 are inclined at respective angles α1 and α2 to the axis 50, which represents the guide direction.

In another embodiment the axes of the fixed rollways 45 and 46 are inclined at respective angles β1 and β2 to the axis 50 and the axes of the mobile rollways 47 and 48 are inclined at respective angles α1 and α2 to the axis 50, which represents the guide direction.

What we claimed is:

1. A linear guide device for connecting the steering column means of an automotive vehicle for displacement relative to the vehicle chassis in the event of impact, comprising:
   (a) a fixed support member (8) adapted for connection with the vehicle chassis, said fixed support member having a generally inverted U-shaped cross-sectional configuration including a generally horizontal base portion (19), and a pair of downwardly directed vertical upright portions (11 and 12), said fixed support member having a longitudinal axis;
   (b) a movable support member (9) supporting said steering column means, said movable support member being arranged congruently for movement within said fixed support member, said movable support member having a generally inverted U-shaped configuration including a generally horizontal base portion (20) and a pair of vertical lateral portions (21 and 22), said movable support member having a longitudinal axis;
   (c) guide means guiding said movable support means for linear longitudinal movement in a guide direction relative to said fixed support member; and
   (d) means (33) biasing said movable member toward a normal first position relative to said fixed member;
   (e) said guide means including:
      (1) a pair of fixed slides (41, 42) mounted in opposed relation on the adjacent sides of said fixed member upright portions, respectively;
      (2) a pair of mobile slides (43, 44) arranged adjacent the outer sides of said movable member lateral portions opposite said fixed slides, respectively,
         (a) each of said mobile slides including at one end an orthogonally arranged tenon portion (51, 52) that extends through a corresponding opening (57, 58) contained in the corresponding movable member lateral portion, respectively, and an orthogonally arranged tongue portion (53, 54) that extends in a lateral engagement with the associated inner side of said movable member lateral portion, respectively;
         (b) means connecting the other ends of said movable slides with said movable member lateral portions, respectively, each of said connecting means including a pin (63, 64) that extends through opposed openings (55, 56; 61, 62) contained in said movable slides and in said movable member lateral portions, respectively;
         (c) said fixed and said movable slides containing opposed fixed (45, 46) and stationary (47, 48) rollways, respectively; and
      (3) a plurality of balls (40) mounted between said fixed and stationary rollways, respectively, whereby upon the event of impact to the vehicle, said movable member is guided by said linear guide means for linear movement forwardly of the vehicle toward a second position relative to said stationary member.

2. The linear guide device claimed in claim 1, wherein said guide means guides said movable member relative to said fixed member in a guidance direction that is raised forwardly of the vehicle relative to a horizontal plane so that in the event of an impact, the steering wheel is raised and pushed forward.

3. The linear guide device claimed in claim 1, wherein said guide means guides said movable member relative to said fixed member in a guidance direction that is inclined forwardly of the vehicle relative to a horizontal plane so that in the event of an impact, said steering wheel is lowered and pushed forward.

4. A linear guide device as claimed in claim 1, wherein said fixed rollway is formed on a fixed slide which constitutes an independent member mounted on and fixed to said fixed support member.

5. A linear guide device as claimed in claim 1, wherein said fixed rollway is formed directly on said fixed support member and defines an integral part of said fixed support member.

6. A linear guide device as claimed in claim 1, wherein said mobile rollway is formed directly on said mobile support member and defines an integral part of said mobile support member.

7. The linear guide device claimed in claim 1, and further including for each of said linear guide means a retaining cage (C) to guarantee the position of said rolling members relative to each other.

8. The linear guide device claimed in claim 1, wherein said fixed rollways have axes inclined at an angle to said guide direction.

9. The linear guide device claimed in claim 1, wherein said mobile rollways have axes inclined at an angle to said guide direction.

10. The linear guide device claimed in claim 1, wherein said fixed rollways have axes inclined to said guide direction, and said mobile rollways have axes inclined to said guide direction.

* * * * *